United States Patent
Schwark et al.

(10) Patent No.: US 9,869,278 B2
(45) Date of Patent: Jan. 16, 2018

(54) GASEOUS FUEL MIXER AND SHUTOFF VALVE

(71) Applicant: Robert Bosch GmbH, Stuttgart (DE)

(72) Inventors: Paul William Schwark, Royal Oak, MI (US); Justin Michael Kern, Milford, MI (US)

(73) Assignee: Robert Bosch GmbH, Stuttgart (DE)

( * ) Notice: Subject to any disclaimer, the term of this patent is extended or adjusted under 35 U.S.C. 154(b) by 300 days.

(21) Appl. No.: 14/610,107

(22) Filed: Jan. 30, 2015

(65) Prior Publication Data

US 2016/0222920 A1    Aug. 4, 2016

(51) Int. Cl.
| | | |
|---|---|---|
| *F02B 43/00* | (2006.01) | |
| *F02M 21/02* | (2006.01) | |
| *F02M 61/14* | (2006.01) | |
| *F02M 69/04* | (2006.01) | |
| *F02M 21/04* | (2006.01) | |

(52) U.S. Cl.
CPC ........ *F02M 21/04* (2013.01); *F02M 21/0239* (2013.01); *F02M 21/0245* (2013.01); *F02M 21/0248* (2013.01); *F02M 21/0278* (2013.01); *F02M 21/0281* (2013.01); *F02M 21/0284* (2013.01); *Y02T 10/32* (2013.01)

(58) Field of Classification Search
CPC ............. F02M 25/0722; F02M 21/042; F02M 21/0278; F02M 61/145; F02M 35/10216; F02M 21/04
USPC .................................. 123/527, 525, 470, 471
See application file for complete search history.

(56) References Cited

U.S. PATENT DOCUMENTS

| | | | | |
|---|---|---|---|---|
| 3,646,924 A | * | 3/1972 | Newkirk ............ | F02M 21/0206 123/527 |
| 5,353,765 A | * | 10/1994 | Saikalis ................ | F02D 19/027 123/438 |
| 5,408,978 A | * | 4/1995 | Davis ................... | F02M 21/042 123/527 |
| 5,522,368 A | | 6/1996 | Tusino | |

(Continued)

FOREIGN PATENT DOCUMENTS

| | | |
|---|---|---|
| DE | 8634567 | 2/1987 |
| DE | 102009017223 | 10/2010 |
| JP | H11324812 | 11/1999 |

*Primary Examiner* — Syed O Hasan
(74) *Attorney, Agent, or Firm* — Michael Best & Friedrich LLP

(57) ABSTRACT

A mixing device for introducing gaseous fuel into an intake passage of an engine, including a body, an annular channel within the body at least partially encircling the intake passage, the body defining a fuel inlet opening. The mixing device includes a plurality of gaseous fuel injectors arranged to discharge gaseous fuel into a fuel inlet manifold, a fuel connection passage extending between the fuel inlet manifold and the fuel inlet opening of the body, a diffuser positioned within the body to diffuse gaseous fuel from the annular channel into the intake airflow, and a valve positioned along the fuel connection passage and configured to selectively block fluid communication between the fuel inlet manifold and the fuel inlet opening of the body in response to a signal from at least one electronic controller programmed to execute control strategies controlling operation of the engine, the gaseous fuel injectors, and the valve.

4 Claims, 12 Drawing Sheets

(56) References Cited

U.S. PATENT DOCUMENTS

| | | | |
|---|---|---|---|
| 5,832,905 A * | 11/1998 | King | F02B 69/00 |
| | | | 123/525 |
| 5,887,574 A | 3/1999 | Smith | |
| 5,908,475 A | 6/1999 | Morris, Jr. et al. | |
| 6,371,092 B1 | 4/2002 | Guglielmo et al. | |
| 6,467,465 B1 * | 10/2002 | Lorts | F02D 19/0692 |
| | | | 123/470 |
| 2002/0148451 A1 | 10/2002 | Yamamoto et al. | |
| 2004/0173192 A1 | 9/2004 | Sorter et al. | |
| 2014/0034022 A1 | 2/2014 | Hu et al. | |

* cited by examiner

GASEOUS FUEL MIXER AND SHUTOFF VALVE

BACKGROUND

The present invention relates to gaseous mixers for introducing gaseous fuel (i.e., fuel that naturally exists in a gaseous state, rather than a liquid state) and recirculated exhaust gas into an intake passage of an internal combustion engine, for example in a passenger vehicle. Gaseous fuels include natural gas (primarily methane) and derivatives thereof, such as butane and propane, but do not include gasoline.

Natural gas can be used to power internal combustion engines. Compared to conventional engines, vehicles run on natural gas are fuel-efficient and environmentally friendly. They are also able to provide good torque and robust performance, while outputting less engine noise than traditional diesel-powered engines. However, in order to meet the needs of a variety of different engines with varying displacement, performance, etc., a high number of specialized parts are required.

Modern natural gas engines employ Exhaust Gas Recirculation (EGR) to provide various performance benefits, including improved efficiency, increased torque, and reduced emissions compared to engines without EGR. The introduction and mixing of fuel and recirculated exhaust gas with intake air require separate devices.

SUMMARY

In one aspect, the invention provides a mixing device for introducing gaseous fuel into an intake passage of an engine, the mixing device including a body through which the intake passage extends for directing the intake airflow into the engine, an annular channel defined within the body to at least partially encircle the intake passage, wherein the body defines a fuel inlet opening intersecting with a radially outer portion of the annular channel, and a plurality of gaseous fuel injectors arranged to discharge gaseous fuel into a fuel inlet manifold. The mixing device further includes a fuel connection passage extending between the fuel inlet manifold and the fuel inlet opening of the body and configured to receive all of the gaseous fuel discharged from all of the plurality of gaseous fuel injectors, a diffuser positioned within the body, wherein the diffuser is positioned along the intake passage at a position of the annular channel to diffuse gaseous fuel from the annular channel into the intake airflow in the intake passage, and a valve positioned along the fuel connection passage and configured to selectively block fluid communication between the fuel inlet manifold and the fuel inlet opening of the body in response to an electrical signal from at least one electronic controller programmed to execute control strategies controlling operation of the engine, the plurality of gaseous fuel injectors, and the valve.

In another aspect the invention provides a method for controlling the discharge of gaseous fuel to an engine, the engine coupled to a mixing device having an annular channel configured to provide gaseous fuel to a diffuser for diffusion into an intake airflow of the engine, the method including the steps of operating a plurality of gaseous fuel injectors to discharge gaseous fuel into a fuel inlet manifold, conveying the injected gaseous fuel from the fuel inlet manifold through a fuel connection passage to the annular channel for diffusion into the intake airflow, and operating the engine to combust the injected gaseous fuel. The method further includes the steps of detecting an ignition off signal and closing a valve along the fuel connection passage in response to the ignition off signal to block the flow of gaseous fuel into the annular channel.

In yet another aspect, the invention provides for a method for operating an engine, the engine coupled to a mixing device having an annular channel configured to provide gaseous fuel to a diffuser for diffusion into an intake airflow of the engine, wherein a fuel connection passage is provided to direct gaseous fuel to the annular channel, and a valve is provided along the fuel connection passage. A plurality of gaseous fuel injectors are operated to discharge gaseous fuel into a fuel inlet manifold which feeds the annular channel through the fuel connection passage. The injected gaseous fuel is diffused into the intake airflow, and the engine is operated to combust the injected gaseous fuel. A demand for engine torque reduction is determined via an electronic controller during engine operation. The valve is operated under control of the electronic controller in response to the demand for engine torque reduction to at least partially limit fluid communication through the fuel connection passage to meet the demanded engine torque reduction while maintaining operation of the engine.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION

FIGS. 1-4 illustrate a mixing device 14 for introducing gaseous fuel (e.g., compressed natural gas) into an intake airflow of an internal combustion engine. The mixing device 14 is positioned along an intake of the engine at least partially defined by an intake passage 18 through the mixing device 14. The mixing device 14 includes a body 22 having a generally cylindrical opening that extends along a central axis A and that accepts a variety of components interchangeably as described in further detail below.

Figure 4:
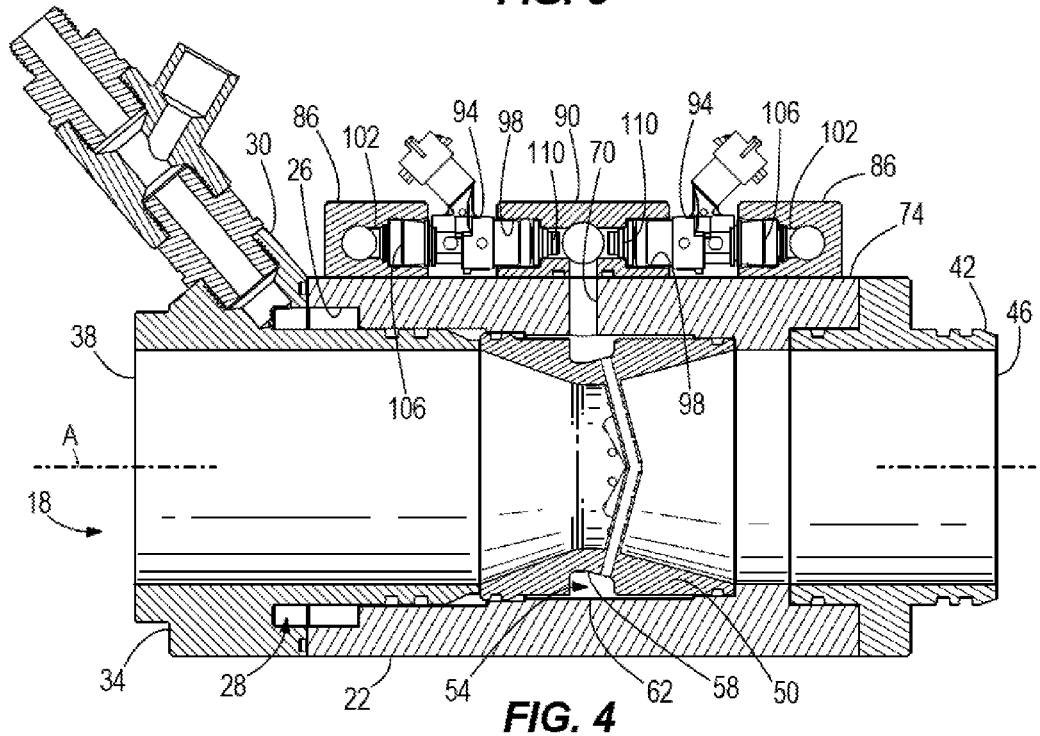
FIG. 4 is a cross section view of the mixing device shown in FIG. 1, taken along the line 4-4 in FIG. 3.

Referring to FIG. 4, the body 22 includes a main gaseous fuel inlet 26 arranged radially outward from the intake passage 18. A throttle body inlet adapter 34 is received by an upstream end of the body 22. The main gaseous fuel inlet 26 of the body is connected to a gaseous fuel supply through a fuel inlet stem 30 of the throttle body inlet adapter 34 (e.g., through various fittings, fuel lines, etc.). The fuel inlet stem 30 is fluidly coupled to the main gaseous fuel inlet 26 of the body 22 on an upstream side thereof. Further, an upstream end of the body 22 and a downstream end of the throttle body inlet adapter 34 together define an annular fuel inlet channel 28 between them (see FIG. 4) which, with the stem 30, jointly define a main gaseous fuel inlet of the mixing device 14. The annular fuel inlet channel 28 is arranged to encircle the intake passage 18. The annular fuel inlet channel 28 is located along the center axis A at a fuel inlet location between the throttle body inlet adapter 34 and the body 22. The throttle body inlet adapter 34 defines a circularly shaped inlet 38 of the mixing device 14, and establishes an inlet diameter from which the intake airflow is introduced to the body 22. The inlet 38 provided by the throttle body inlet adapter 34 may be sized corresponding to a diameter of a throttle body of the engine, so that the diameters match. The throttle body inlet adapter 34 also includes various temperature and pressure sensors (not shown) which communicate with electronic devices outside the mixing device 14 in order to assist in controlling the mixing device 14. An outlet adapter 42 is arranged downstream of the body 22 and provides a circularly shaped outlet 46 of the mixing device 14 through which the intake air flow is directed to the engine after mixing with the gaseous fuel. The throttle body inlet adapter 34 and the outlet adapter 42 are removably secured to first and second ends of the body 22 (i.e., by mounting screws) and extend at least partially into the body 22 when secured to the body 22. The outlet adapter 42 is removably secured at the outlet 46 to an intake (e.g., pipe or manifold) of the engine and, when removably secured to the body 22, a radially inner surface of the outlet adapter 42 is flush with a radially inner surface of the generally cylindrical opening of the body 22.

A diffuser 50 is positioned within the body 22 along the intake passage 18 (see FIG. 4) and is configured to promote mixing of the intake airflow with the gaseous fuel (i.e., by distributing the gaseous fuel within the intake air and by creating turbulence) as discussed in more detail below. The diffuser 50 is sealed with O-rings (not shown) at each end of the diffuser 50 inside the body 22. The diffuser 50 is radially enclosed by the body 22.

The throttle body inlet adapter 34 and the outlet adapter 42 define, with the body 22 and the diffuser 50, the intake passage 18 through the mixing device 14. The intake passage 18 extends axially from the inlet 38 to the outlet 46 and is configured to direct the intake airflow from the inlet 38 to the outlet 46. The intake passage 18 is radially defined by inner surfaces of the throttle body inlet adapter 34, the outlet adapter 42, the body 22, and the diffuser 50 and is centered about the axis A.

The diffuser 50 is arranged within the body 22 and is at least partially encircled by the body 22 along the intake passage 18 at a mixing location along the center axis A where gaseous fuel is configured to be mixed with the intake airflow. The diffuser 50, with the body 22, defines an annular channel 54 between a radially outer surface of the diffuser 58 and a radially inner surface 62 of the body 22. The annular channel 54 is arranged along the center axis A at the mixing location of the intake passage 18 and at least partially encircles the intake passage 18 at the mixing location (see FIG. 4). One or more inlets 70 (e.g., three inlets 70) to the annular channel 54 are defined by the body 22 at the mixing location. The inlets 70 to the annular channel 54 are circular apertures which extend radially relative to the center axis A from an exterior surface 74 of the body 22 to the annular channel 54. In the illustrated construction, two of the inlets 70 to the annular channel 54 are spaced 180 degrees apart about the center axis A. The third inlet 70 to the annular channel 54 is spaced 90 degrees apart from the first two inlets 70 to the annular channel 54 about the center axis A. As illustrated, this corresponds to the exterior surface 74 of the body 22 being provided with a generally rectangular shape, having perpendicular surface portions, but other configurations of the exterior surface 74 are optional.

As illustrated in FIG. 4, the diffuser 50 is a diffuser insert separate from the body 22 and removably positioned or coupled to the body 22. An upstream end of the diffuser 50 abuts a downstream end of the throttle body inlet adapter 34. The downstream end of the diffuser 50 abuts an internal shoulder formed in the opening of the body 22. The diffuser 50 is configured to receive gaseous fuel from the annular channel 54 and to diffuse gaseous fuel from the annular channel 54 into the intake airflow in the intake passage 18. The diffuser 50 defines a series of radial diffuser apertures 82 arranged generally perpendicular to the center axis A. The radial diffuser apertures 82 introduce the gaseous fuel into the intake airflow. The diffuser 50 is further configured to narrow the intake passage 18 as the intake airflow approaches the mixing location, before expanding to widen the intake passage 18 after the intake airflow has passed the mixing location (see FIGS. 2, 4). This narrowing of the intake passage 118 is for the purpose of employing the Venturi effect to create a localized pressure drop within the intake airflow, to assist with the introduction of gaseous fuel into the intake airflow.

Figure 1:
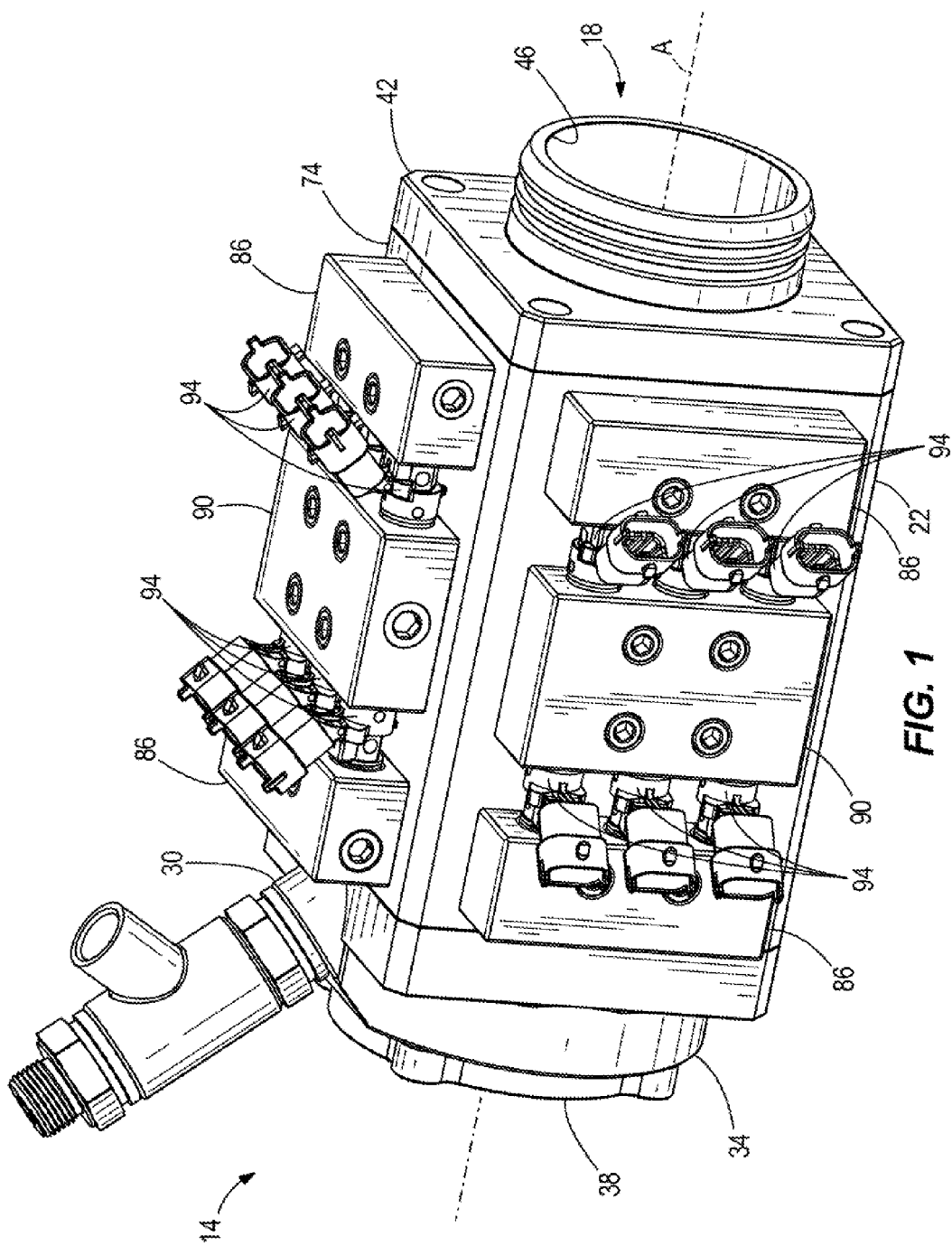
FIG. 1 is a perspective view of a mixing device according to one embodiment of the invention.
Figure 2:
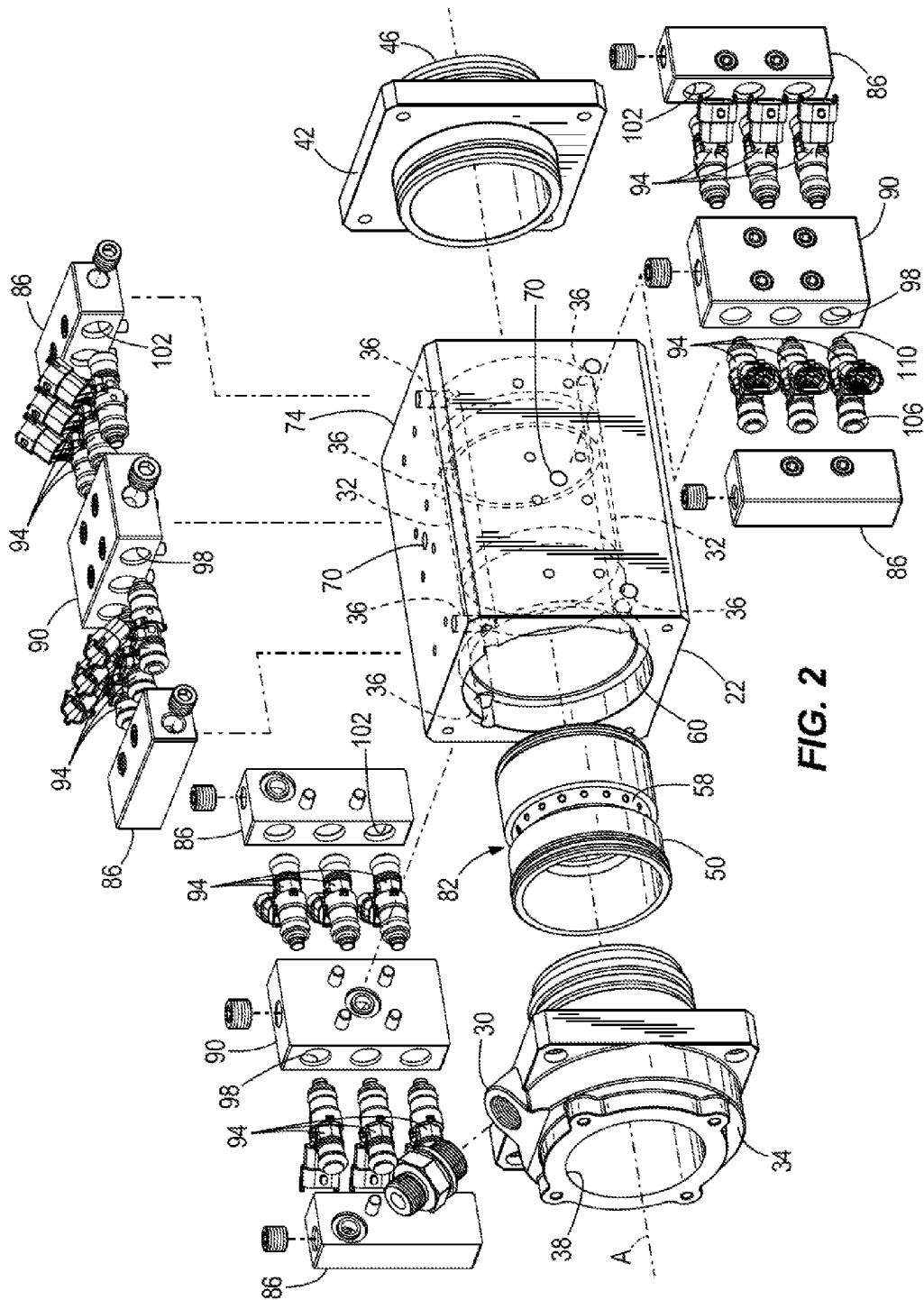
FIG. 2 is an exploded assembly view of the mixing device shown in FIG. 1 with passages internal to a body of the mixing device shown in phantom.
Figure 3:
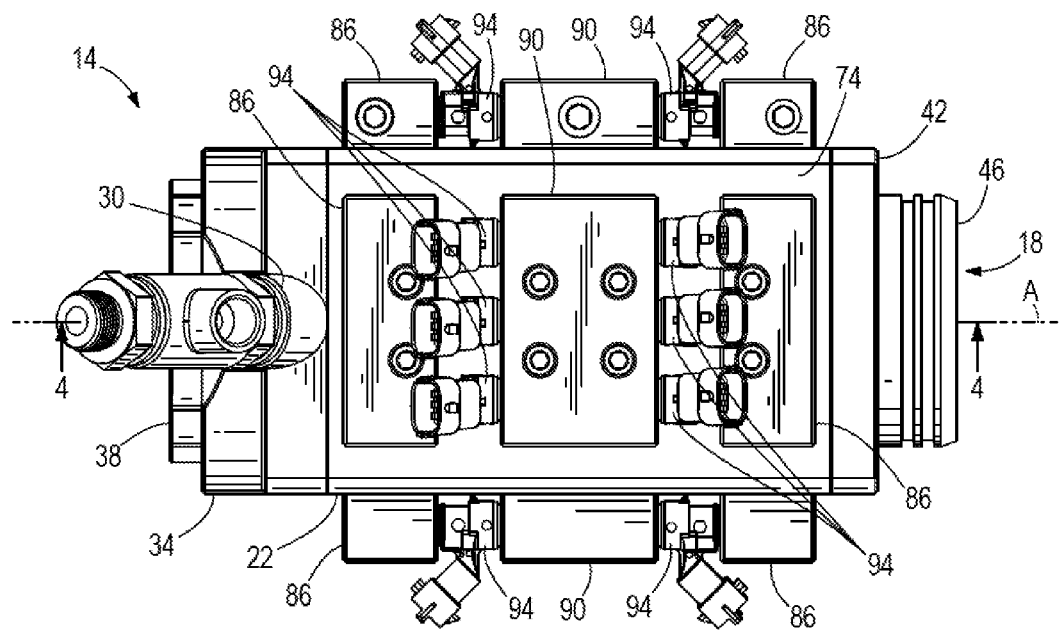
FIG. 3 is a top view of the mixing device shown in FIG. 1.

As discussed above, gaseous fuel is supplied to the mixing device 14 from the fuel supply through the fuel inlet stem 30 to the body 22 at the main gaseous fuel inlet 26. Referring to FIGS. 2 and 4, the gaseous fuel is directed to the main gaseous fuel inlet 26 and the annular fuel inlet channel 28. The gaseous fuel is directed from the annular fuel inlet channel 28 to three axial fuel passages (e.g., tubes) 32 arranged within the body 22. The axial fuel tubes 32 extend from the annular fuel inlet channel 28 a majority of the axial length of the body 22. The axial fuel passages 32 are positioned radially outward from the intake passage 18 relative to the center axis A. Each of the axial fuel passages 32 directs gaseous fuel to two separate radial fuel passages (e.g., tubes) 36, which are each configured to direct gaseous fuel radially outward to a corresponding fuel supply manifold 86 of the mixing device 14. As a result of this configuration, a plurality of fuel supply manifolds 86 are connected in parallel to receive gaseous fuel from the main gaseous fuel inlet 26.

In the illustrated construction, the mixing device 14 includes six fuel supply manifolds 86, with each of the fuel supply manifolds 86 configured to receive gaseous fuel from one of the two separate radial fuel passages 36 coupled to each of the three axial fuel passages 32. The fuel supply manifolds 86 are removably secured to the exterior 74 of the body 22. The fuel supply manifolds 86 are arranged in groups of two on three sides of the body 22, with each group of two fuel supply manifolds 86 spaced axially along the exterior 74 of the body 22. In an alternative configuration not illustrated, the fuel supply manifolds 86 may be placed on all four sides of the body 22.

As best shown in FIG. 4, a fuel inlet manifold 90 is arranged between each corresponding set of two fuel supply manifolds 86. The fuel inlet manifolds 90 are removably secured to the exterior 74 of the body 22 and fluidly connected to the body 22 at the inlets 70 to the annular channel 54. The fuel inlet manifolds 90 are each centered over one of the inlets 70 to the annular channel 54. Two of the fuel inlet manifolds 90 are spaced 180 degrees apart about the center axis A. The third fuel inlet manifold 90 is spaced 90 degrees apart from the first two fuel inlet manifolds 90 about the center axis A. The fuel inlet manifolds 90 are fluidly connected to the two fuel supply manifolds 86 arranged on each side of the fuel inlet manifold 90 through one or more gaseous fuel injectors 94. As illustrated, each fuel supply manifold 86 is provided with fuel injector ports 102 to accommodate three gaseous fuel injectors 94, and each fuel inlet manifold 90 includes six injector receiving ports 98, three on each of two opposing sides. This results in six groups of three gaseous fuel injectors 94. Each gaseous fuel injector 94 has an inlet or upstream end 106 coupled to a fuel injector port 102 of the corresponding fuel supply manifold 86 and an outlet or discharge end 110 coupled to an injector receiving port 98 of the corresponding fuel inlet manifold 90. Each of the gaseous fuel injectors 94 couples to each of the fuel inlet manifolds 90 at the injector receiving ports 98, which are shaped and sized to receive the discharge end 110 of each of the gaseous fuel injectors 94. In an alternative configuration not illustrated, fuel inlet manifolds 90 may be placed on all four sides of the body 22.

Each fuel inlet manifold 90 is configured to receive gaseous fuel from the gaseous fuel injectors 94 coupled to the fuel supply manifolds 86 located on opposing sides of each of the fuel inlet manifolds 90. Further, each of the fuel inlet manifolds 90 is configured to direct gaseous fuel radially inward into the annular channel 54 (i.e., perpendicular to the axis A) through the inlets 70 to the annular channel 54 through the diffuser 50 at the mixing location. Thus, the gaseous fuel injectors 94 of the mixing device 14 provide central point injection to the engine, with all the gaseous fuel from all of the injectors 94 being distributed generally evenly at a downstream location into a plurality of engine cylinders.

Figure 13:
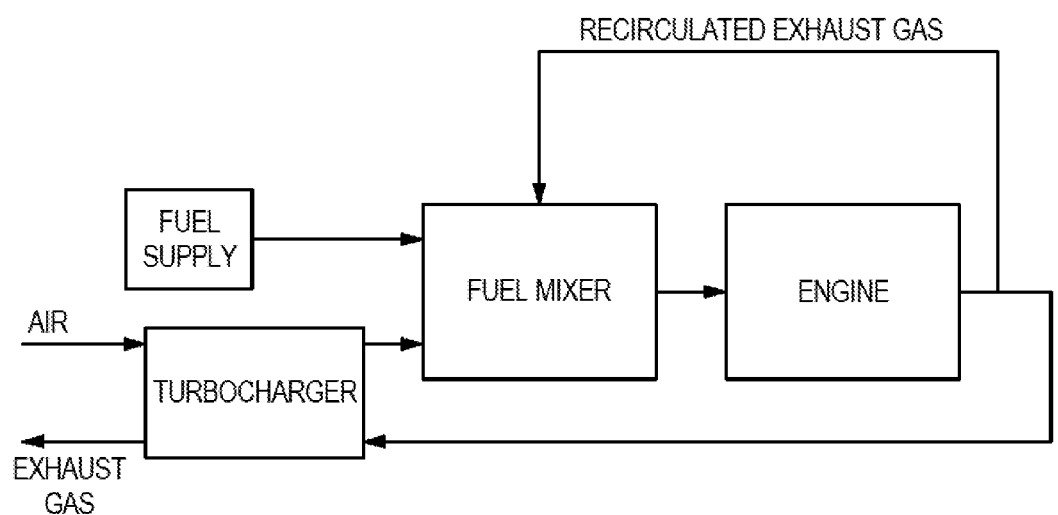
FIG. 13 is a schematic of an engine system including a mixing device according to the present invention.

FIG. 13 illustrates a schematic of a fuel mixer and engine (e.g. a diesel-powered engine) in operation. In operation, the mixing device 14 is supplied with the intake airflow. The intake airflow enters through the inlet 38 into the intake passage 18. Gaseous fuel is supplied by the fuel supply to the main gaseous fuel inlet 26 from which the gaseous fuel reaches the fuel supply manifolds 86, as discussed above. The gaseous fuel injectors 94 then inject the gaseous fuel from the fuel supply manifolds 86 into the fuel inlet manifolds 90, which direct the gaseous fuel through the inlets 70 to the annular channel 54. From the annular channel 54, the gaseous fuel is directed radially inward through the radial diffuser apertures 82 of the diffuser 50 where the gaseous fuel is mixed with the intake airflow and directed to the outlet 46. Although the mixing device 14 is not illustrated with an inlet for exhaust gas recirculation (EGR), one can be provided so that the mixing device 14 is configured to diffuse exhaust gas from the engine into the intake airflow. More particularly, the mixing device 14 may be provided with exhaust gas from the engine through a bypass line upstream of a turbocharger, with the turbocharger configured to compress the intake air in the intake passage 18, as shown in FIG. 13. This arrangement of the turbocharger and the bypass line allows for high pressure EGR to enter the mixing device 14 at the inlet for EGR. High pressure EGR is differentiated from low pressure EGR in that high pressure EGR feeds recirculated exhaust gas into an intake having air compressed by means of forced induction, rather than naturally aspirated.

Figure 5:
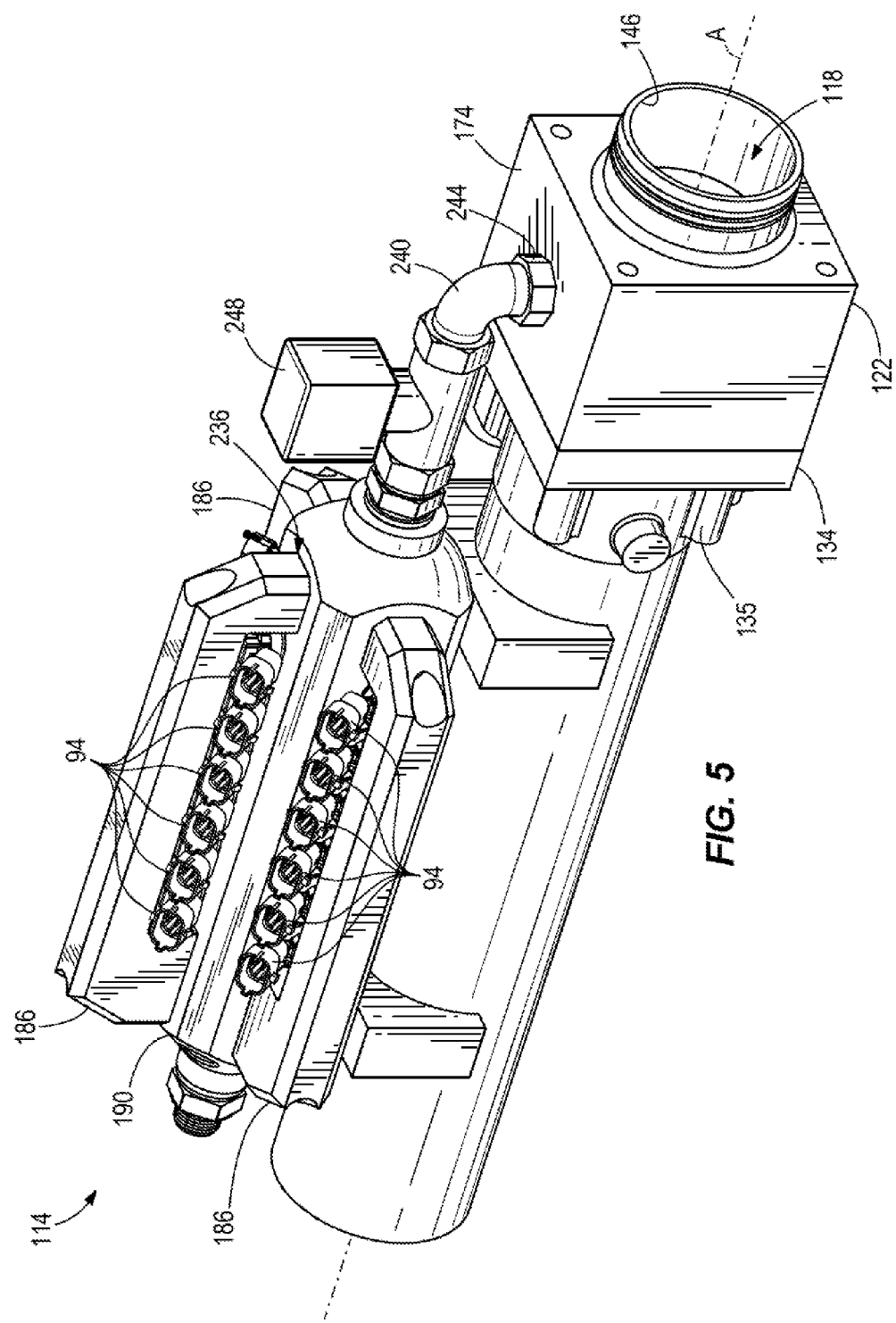
FIG. 5 is a perspective view of a mixing device according to another embodiment of the invention.
Figure 6:
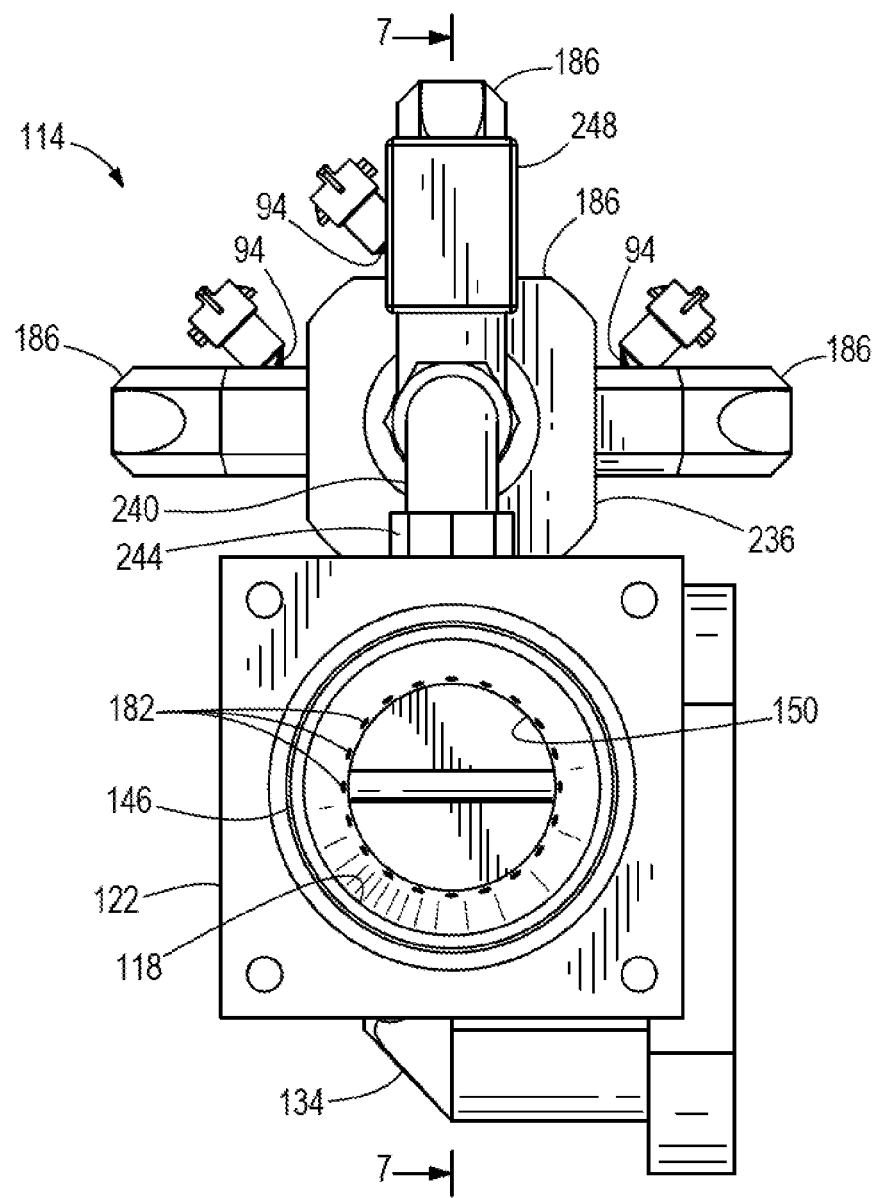
FIG. 6 is a front view of the mixing device shown in FIG. 5.
Figure 7:
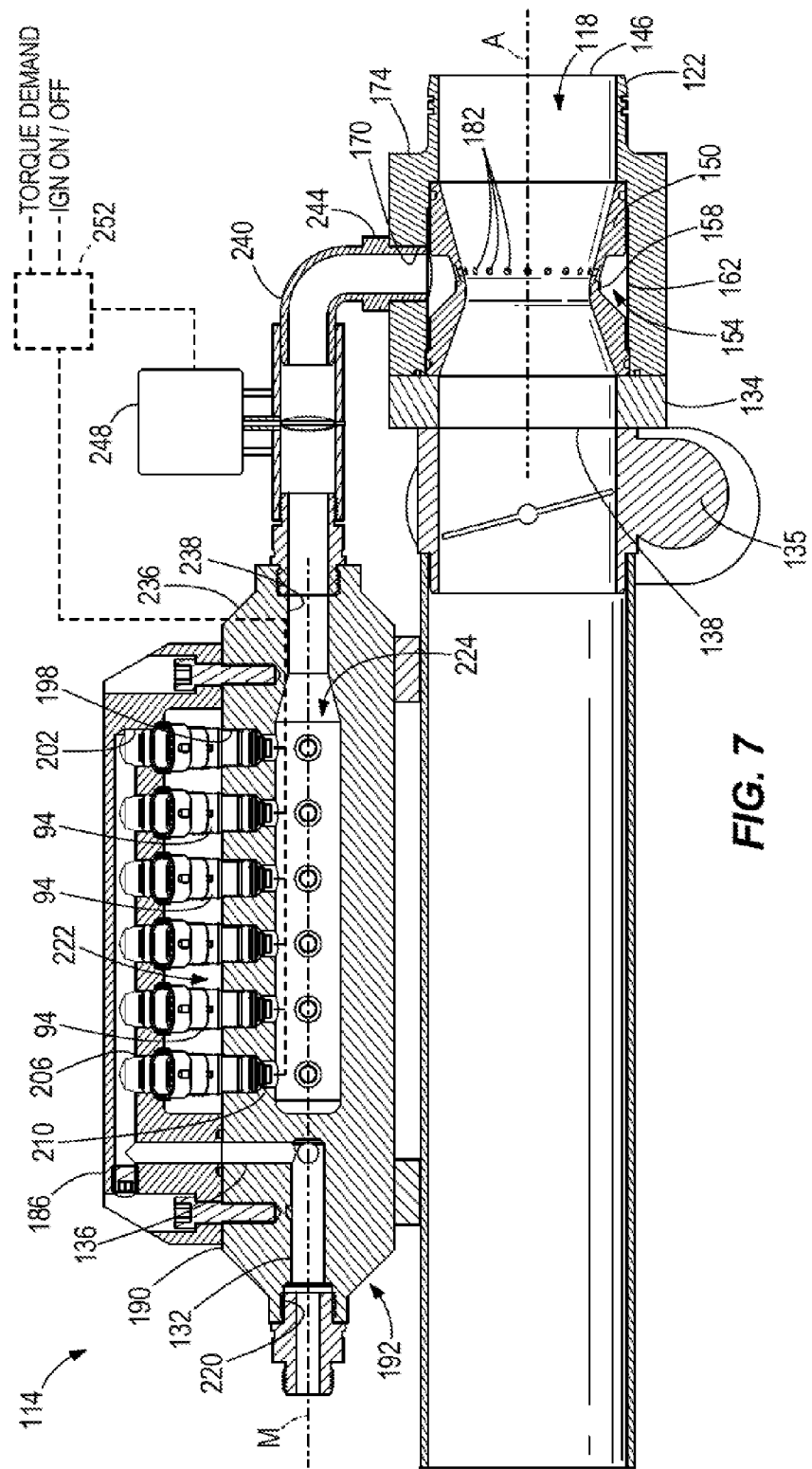
FIG. 7 is a cross section view of the mixing device shown in FIG. 5, taken along the line 7-7 of FIG. 6.

FIGS. 5-7 illustrate a mixing device 114, according to another embodiment, for introducing gaseous fuel from a fuel supply into an intake airflow of an engine along an intake passage 118. Note that parts similar to those in FIGS. 1-4 have the same numbers but increased by 100. Similarly numbered parts also have similar functions, and the above description is relied upon where appropriate. The throttle body inlet adapter 134 is removably coupled to an upstream end of a body 122. The throttle body inlet adapter 134 defines an air inlet 138 of the mixing device 114 configured to match the diameter of a throttle body 135 directly upstream of the adapter 134. The throttle body inlet adapter 134 is removably secured at the inlet 138 to the throttle body 135. The body 122 has a generally cylindrical opening and defines an outlet 146 for providing air and gaseous fuel to the engine. Although the mixing device outlet 146 is provided integral as a single piece with the body 122, the outlet 146 can optionally be provided as a separate adapter removably coupled to the body 122. The body 122 further defines an inlet 170 extending radially inward to the annular channel 154 from an exterior 174 of the body 122. The mixing device 114 further includes a diffuser 150 which, as shown, is a diffuser insert formed separately from the body 122 and removably coupled to the body 122. The components positioned directly downstream of the throttle body 135 form a mixer subassembly or diffuser assembly. Injection of gaseous fuel is provided to the diffuser subassembly from a separate subassembly including a single modular fuel inlet manifold 190.

As shown in FIG. 7, the body 122 and the diffuser 150 jointly define the annular channel 154. The body 122 defines a radially outer portion 162 of the annular channel 154 and the diffuser 150 defines a radially inner portion 158 of the annular channel 154. Further, the body 122, the diffuser 150, and the throttle body inlet adapter 134 define the intake passage 118. The intake passage 118 extends from the inlet 138 to the outlet 146. The intake passage 118 is radially defined by radially inner surfaces of the throttle body inlet adapter 134, the body 122, and the diffuser 150. The intake passage 118 defines a center axis A. The inlet 170 to the annular channel 154, the annular channel 154, and the diffuser 150 are positioned axially along the intake passage 118 at a mixing location where gaseous fuel is diffused into the intake airflow.

Referring to FIG. 7, the mixing device 114 includes the fuel inlet manifold 190 fluidly coupled to the body 122. Further, the fuel inlet manifold 190 defines a manifold axis M parallel to and spaced from the center axis A of the intake passage 118. In position on an engine of a vehicle, the fuel inlet manifold 190 is positioned above the throttle body 135 and the body 122. The fuel inlet manifold 190 is a singular body including an upstream portion 192 having a fuel inlet 220 serving as a main fuel inlet of the mixing device 114, and a downstream portion 222 with a common injector receiving chamber 224 for a plurality of gaseous fuel injectors 94. The main fuel inlet 220 is fluidly coupled to the injector receiving chamber 224 by one or more fuel supply manifolds 186, as discussed below. In the illustrated construction, the fuel inlet manifold 190 defines 18 injector receiving ports 198 provided in separate groups or rows on different sides of the fuel inlet manifold 190. Regardless of number, all of the gaseous fuel injectors 94 of the mixing device 114 are coupled to the fuel inlet manifold 190. From the main fuel inlet 220, gaseous fuel flows through a first (e.g., axial) passage 132, where the gaseous fuel is then diverted (e.g., radially outward from the manifold axis M through three radial passages 136) to one or more fuel supply manifolds 186.

In the illustrated construction, three fuel supply manifolds 186 are removably secured to an exterior 236 of the fuel inlet manifold 190 (i.e., via mounting screws) and are radially arranged around the manifold axis M. The fuel supply manifolds 186 are arranged such that two of the fuel supply manifolds 186 are spaced 180 degrees apart about the manifold axis M (see FIG. 6). The third fuel supply manifold 186 is spaced 90 degrees apart from each of the first and second fuel supply manifolds 186 about the manifold axis M.

A group of (e.g., six aligned) gaseous fuel injectors 94 are removably coupled to fuel injector ports 202 of the corresponding fuel supply manifold 186. For example, an inlet or upstream end 206 of each gaseous fuel injector 94 is sealingly received in one of the fuel injector ports 202. An outlet or discharge end 210 of each gaseous fuel injector 94 is removably coupled to an injector receiving port 198 of the fuel inlet manifold 190 so that the injectors 94 inject into the common injector receiving chamber 224. Each of the gaseous fuel injectors 94 is configured to discharge fuel into the common injector receiving chamber 224 radially toward the manifold axis M. The common injector receiving chamber 224 is configured to direct gaseous fuel downstream along the manifold axis M to an outlet 238 of the fuel inlet manifold 190 and to a fuel connection passage 240. The fuel connection passage 240 has a downstream end 244 coupled to the body 122 such that the fuel connection passage 240 fluidly connects the common injector receiving chamber 224 with the inlet 70 to the annular channel 154.

The fuel connection passage 240 is configured to receive all of the gaseous fuel discharged from all of the gaseous fuel injectors 94 and to direct the gaseous fuel to the annular channel 154 for diffusion into the intake airflow through radial diffuser apertures 182 of the diffuser 150. However, a valve 248 is coupled to and positioned along the fuel connection passage 240. The valve 248 is configured to selectively block fluid communication between the fuel inlet manifold 190 and the annular channel 154. The mixing device 114 further includes a controller 252 configured to selectively actuate the valve 248 and control operation of the gaseous fuel injectors 94.

FIG. 13 illustrates a schematic of the mixing device 114 and the engine in operation. In operation, the mixing device 114 is supplied with the intake airflow through the inlet 138 into the intake passage 118. Gaseous fuel is supplied to the main fuel inlet 220 from the fuel supply, where it is directed to the fuel supply manifold(s) 186, and is injected by the gaseous fuel injectors 94 into the common injector receiving chamber 224, as discussed above. From the common injector receiving chamber 224, gaseous fuel is directed through the inlet 170 to the annular channel 154, and through the diffuser 150. The diffuser 150 directs gaseous fuel radially inward towards the center axis A of the intake passage 118 through the radial diffuser apertures 182 of the diffuser 150, where the gaseous fuel is mixed with the intake airflow and directed to the engine via the outlet 146. Although the mixing device 114 is not illustrated with an inlet for EGR, one can be provided so that the mixing device 114 is configured to diffuse exhaust gas from the engine into the intake airflow. As illustrated in FIG. 13 and discussed above, the mixing device 114 may be provided with high pressure EGR.

The mixing devices 14, 114 shown in FIGS. 1-4 and 5-7, respectively, are configured to be customizable to accommodate for different engine needs and different applications. For this purpose, the various parts of the mixing device 14, 114 which are removably secured to the mixing devices 14, 114 can be removed when not needed for a particular application or engine, or replaced with a more suitable part. For instance an entire fuel supply manifold 86, 186 can be removed from either embodiment of the mixing device 14, 114, with the corresponding gaseous fuel injectors 94 removed and the corresponding injector receiving ports 98, 198 blocked to prevent leakage of gaseous fuel from the fuel inlet manifold 90, 190 of the mixing device 14, 114. Similarly, other openings revealed by removal of the fuel supply manifolds 86, 186 that are in fluid communication with the fuel supply can be similarly blocked. It will be understood that one or more than one fuel supply manifold 86, 186 can be removed. Alternately, the fuel supply manifolds 86, 186 may remain in place, but be provided with a number of gaseous fuel injectors 94 that is less than the total number of fuel injector ports 102, 202. Unused fuel injector ports 102, 202 and the corresponding injector receiving ports 98, 198 can be blocked or plugged.

Referring to the embodiment in FIGS. 1-4, the diffuser 50, the throttle body inlet adapter 34, and the outlet adapter 42 are removable and replaceable to customize the mixing device 14. The throttle body inlet adapter 34 can be removed entirely, or replaced with another throttle body inlet adapter 34 that establishes a different inlet diameter, different connection size or type, and/or has a connection to the fuel supply different from the illustrated fuel stem 30. The diffuser 50 can be removed or replaced with another diffuser 50 that is customized to differently mix the gaseous fuel with the intake airflow by creating a different pressure drop and/or distribution of gas across the intake airflow cross-section (i.e., for different engine demands or applications). For example, the quantity of the radial diffuser apertures 82 may be increased or decreased, the geometry of the diffuser 50 may be altered such that the annular channel 54 and the intake passage 18 are defined differently, or the overall length of the diffuser 50 may be increased or decreased. Additionally, the outlet adapter 42 may be removed or replaced with a different outlet adapter 42. The different outlet adapter 42 may be provided with an alternate outlet diameter, provide a different connection type to the engine or otherwise define the intake passage 18 in a different manner.

Additionally, one of the fuel inlet manifolds 90 can be removed. In such an embodiment the fuel supply manifolds 86 located on either side of the fuel inlet manifold 90 may be removed as the fuel supply manifolds 86 on either side would no longer be fluidly connected to the annular channel

54. More than one of the fuel inlet manifolds 90 can be removed in this way, along with the corresponding fuel supply manifolds 86 on either side of the fuel inlet manifold 90. One or more openings in the body 22 revealed by removal of the fuel inlet manifold 90 (e.g., the inlet 70) can be blocked to prevent leakage of gaseous fuel from the mixing device 14.

In the mixing device 114 of FIGS. 5-7, the throttle body inlet adapter 134 and the diffuser 150 are removably secured (i.e., via mounting screws) or removably coupled to the body 122, as described above. These components of the mixing device 114 are similarly customizable as those of the mixing device 14. Further, the fuel supply manifolds 186 are removably secured to the exterior 236 of the fuel inlet manifold 190.

Referring to FIGS. 1-7, the injector receiving ports 98, 198 of the fuel inlet manifold 90, 190, in addition to being shaped and sized to receive a discharge end 110, 210 of the gaseous fuel injectors 94, are also shaped and sized to receive plugs 300. Each of the plugs 300 can be, as in FIGS. 8-9, a dummy fuel injector that is configured to take the place of a gaseous fuel injector 94 in the mixing device 14, 114. A dummy fuel injector has a shape that is similar to one of the functional gaseous fuel injectors 94 (e.g., having the same or similar sealing interfaces at its ends) but is not capable of injecting fuel, and may be provided with no fluid conduit whatsoever. In general, the plugs 300 may be seals that are insertable into the injector receiving ports 98, 198, or a flat plate which can be used to cover the injector receiving ports 98, 198 from the outside of the fuel inlet manifold 90, 190. The plug 300, in any form, prevents fluid communication through the corresponding injector receiving port 98, 198. Use of plugs 300 reduces to the total gaseous fuel output that can be directed to the engine through the intake passage 18, 118.

Further, one of the fuel supply manifolds 86, 186 and the corresponding fuel inlet manifold 90, 190 may have different numbers of fuel injector ports 102, 202 and injector receiving ports 98, 198, respectively. For instance, one or more of the fuel supply manifolds 86, 186 may include fewer fuel injector ports 102, 202 than the number of injector receiving ports 98, 198 on the corresponding fuel inlet manifold 90, 190. After coupling one of the gaseous fuel injectors 94 to each of the fuel injector ports 102, 202 and the corresponding injector receiving ports 98, 198, the remaining unoccupied injector receiving ports 98, 198 may be blocked using plugs 300.

Referring again to FIGS. 1-4 and 8, the fuel inlet manifold 90 includes two separate groups of three injector receiving ports 98 on opposite sides of each fuel inlet manifold 90. These injector receiving ports 98 align with the fuel injector ports 102 on the fuel supply manifolds 86 arranged on either side of the fuel inlet manifold 90. Referring to FIGS. 5-7 and 9, the fuel inlet manifold 190 includes three separate groups of six injector receiving ports 198 on three sides of the fuel inlet manifold 190. The injector receiving ports 198 align with the fuel injector ports 202 on the three fuel supply manifolds 186. The injector receiving ports 98 in FIGS. 1-4 and 8, as shown, are all similarly shaped and sized to receive one common type of gaseous fuel injector. Likewise as shown in FIGS. 5-7 and 9, the injector receiving ports 198 are all similarly shaped and sized to receive one common type of gaseous fuel injector.

Figure 8:
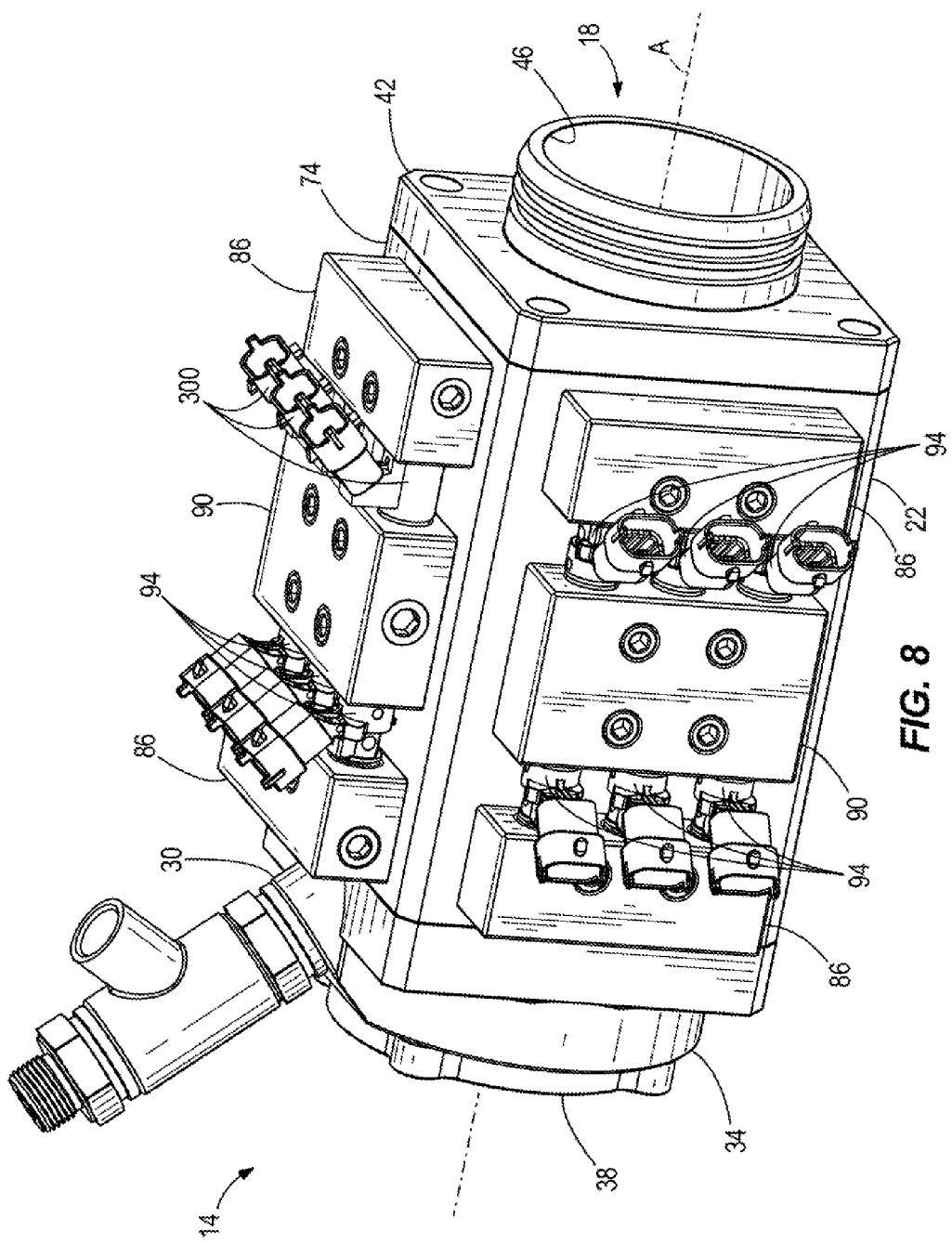
FIG. 8 is a perspective view of the mixing device shown in FIG. 1, reconfigured with plugs replacing a number of gaseous fuel injectors.

As shown in FIG. 8, the plug 300 is a dummy injector 300 received in the fuel injector port 102 of the fuel supply manifold 86 where the upstream end 106 of a functional gaseous fuel injector 94 would normally be received. Similarly, the plug 300 is received in the injector receiving port 198 of the fuel inlet manifold 90 where the discharge end 110 of the gaseous fuel injector 94 would normally be received. The plug 300 prevents fluid communication of fuel from the fuel supply manifold 86 to the fuel inlet manifold 90. More than one such plug 300 may be used. For instance, each fuel supply manifold 86 may receive one of the plugs 300 in place of a functional gaseous fuel injector 94 to evenly or symmetrically "downsize" the mixing device 14 such that each fuel supply manifold 86 feeds only two gaseous fuel injectors 94. The mixing device 14 can be symmetrically downsized in other configurations as well, and can be downsized asymmetrically. For example, as shown in FIG. 8, one entire group of injector receiving ports 98 corresponding to one fuel supply manifold 86 can be "turned off" at the point of assembly (e.g., blocked with plugs 300). As shown, three plugs 300, as described above, prevent fluid communication between one of the fuel supply manifolds 86 and the corresponding fuel inlet manifold 90. Similarly, one or more injector receiving ports 98 of additional fuel inlet manifolds 90 can be blocked.

Figure 9:
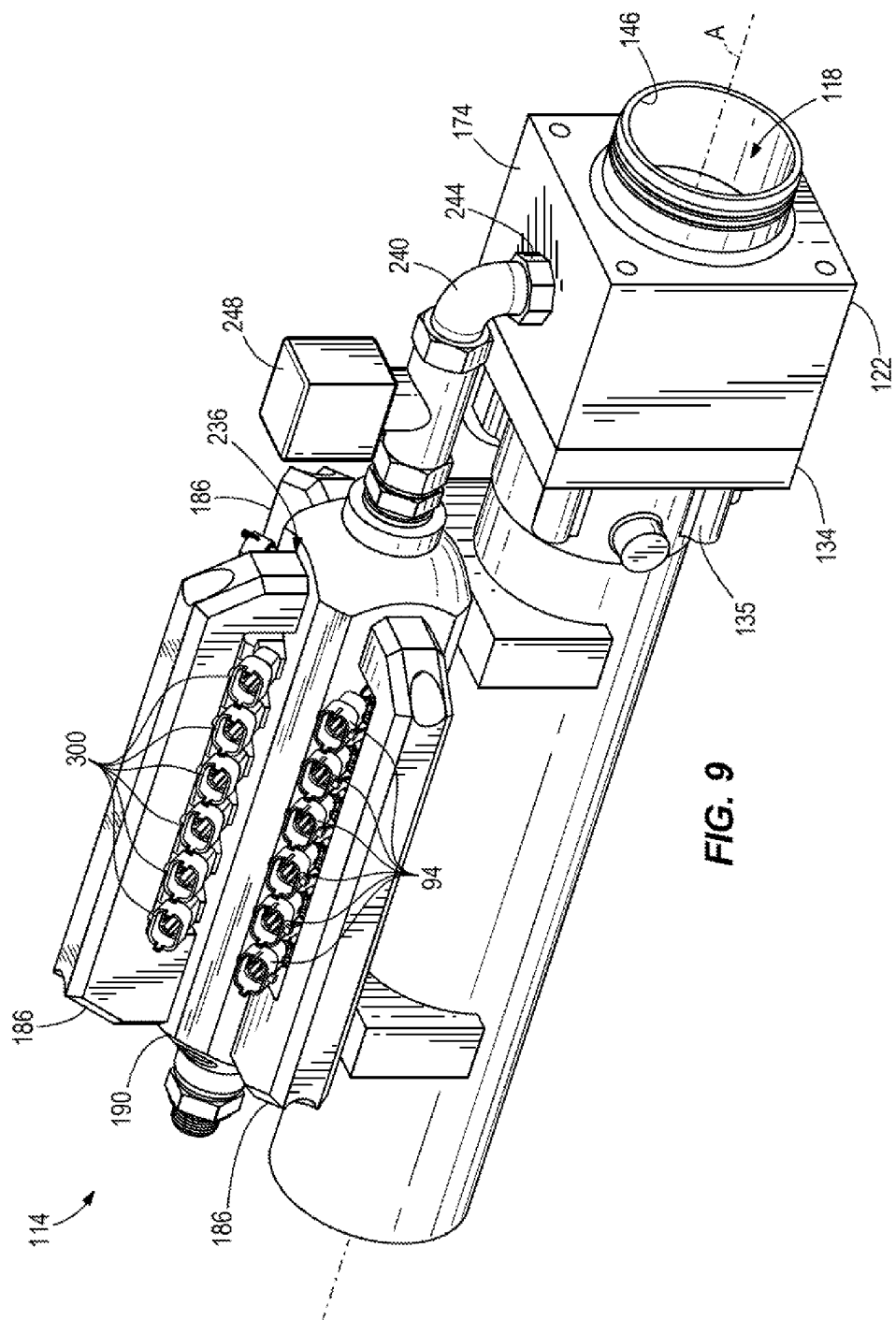
FIG. 9 is a perspective view of the mixing device shown in FIG. 5, reconfigured with plugs replacing a number of gaseous fuel injectors.

As shown in FIG. 9, an entire group of injector receiving ports 198 corresponding to one of the fuel supply manifolds 186 is blocked with plugs 300. As shown, six plugs 300 entirely block fluid communication from one of the fuel supply manifolds 186 to the common injector receiving chamber 224 of the fuel inlet manifold 190. Similarly, one or more additional fuel injector ports 202 of additional fuel supply manifolds 186 can be blocked from fluid communication with the common injector receiving chamber 224 of the fuel inlet manifold 190 by the use of additional plugs 300.

The modular components of the mixing device 14, 114 may be assembled to equip an internal combustion with a mixing device 14, 114 in order to introduce gaseous fuel into the engine. For example, the mixing device 14 of FIG. 8 may be assembled by providing the body 22, removably coupling the diffuser 50 in the body 22, and securing the throttle body inlet adapter 34 and the outlet adapter 42 to the body 22. The six fuel supply manifolds 86 and the three fuel inlet manifolds 90 are also secured to the body 22. A number (e.g. three) of the injector receiving ports 98 are blocked by the plugs 300, as shown in FIG. 8 in order to decrease the fueling capacity of the mixing device 14 to the engine. The unblocked injector receiving ports 98 are fluidly connected to the remaining fuel supply manifolds 86 by the gaseous fuel injectors 94.

In another example, the mixing device 114 of FIG. 9 may be assembled by providing the body 122, removably coupling the diffuser 150 in the body 122, and removably securing the throttle body inlet adapter 134 to the body 122. The fuel inlet manifold 190 is coupled to the diffuser assembly (i.e., at the opening 170 of the body 122) with the fuel connection passage 240 and the valve 248. Each of the three fuel supply manifolds 186 is removably coupled to an exterior 136 of the fuel inlet manifold 190. Each of the fuel supply manifolds 186 has a separate group of fuel injector ports 202 (e.g., groups of six), and all six of the fuel injector ports 202 of one of the fuel supply manifolds 186 may be blocked using the plugs 300, as shown in FIG. 9. Gaseous fuel injectors 94 are removably coupled to the other two fuel supply manifolds 186 and the fuel inlet manifold 190 to complete the mixing device 114, as shown.

Figure 10:
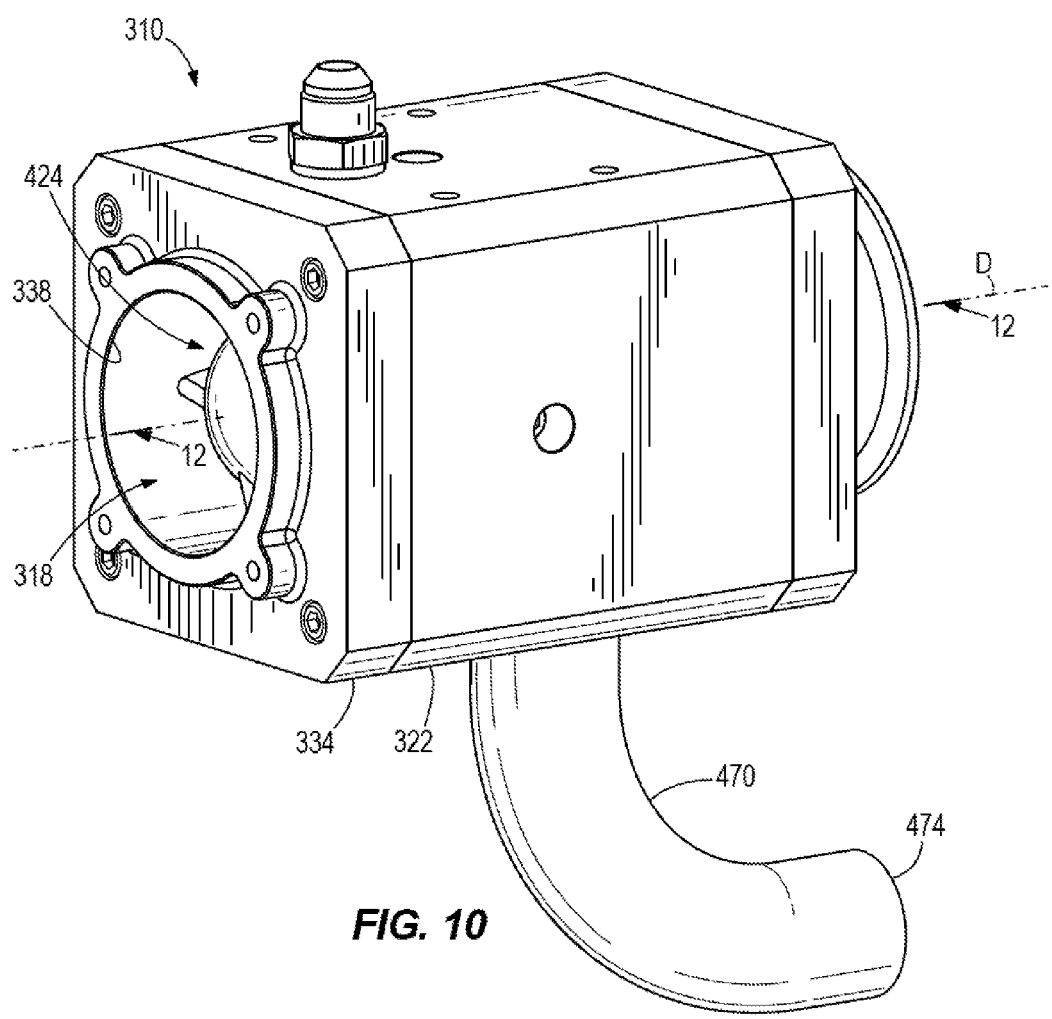
FIG. 10 is a perspective view of a diffuser assembly that can be used to replace a throttle body inlet adapter, a body, and a diffuser of the mixing device of FIGS. 5-7 and 9.
Figure 11:
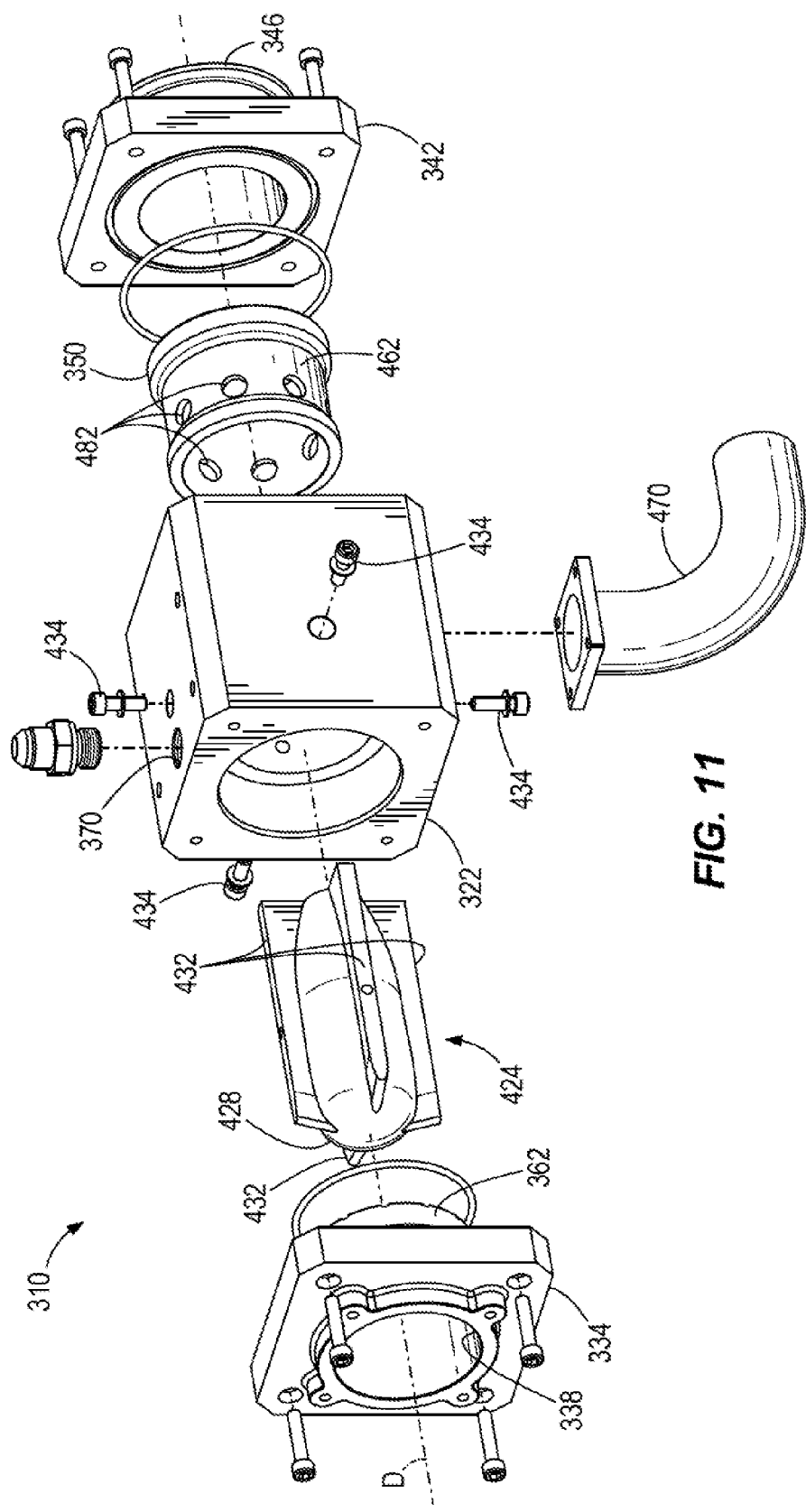
FIG. 11 is an exploded assembly view of the diffuser assembly shown in FIG. 10.
Figure 12:
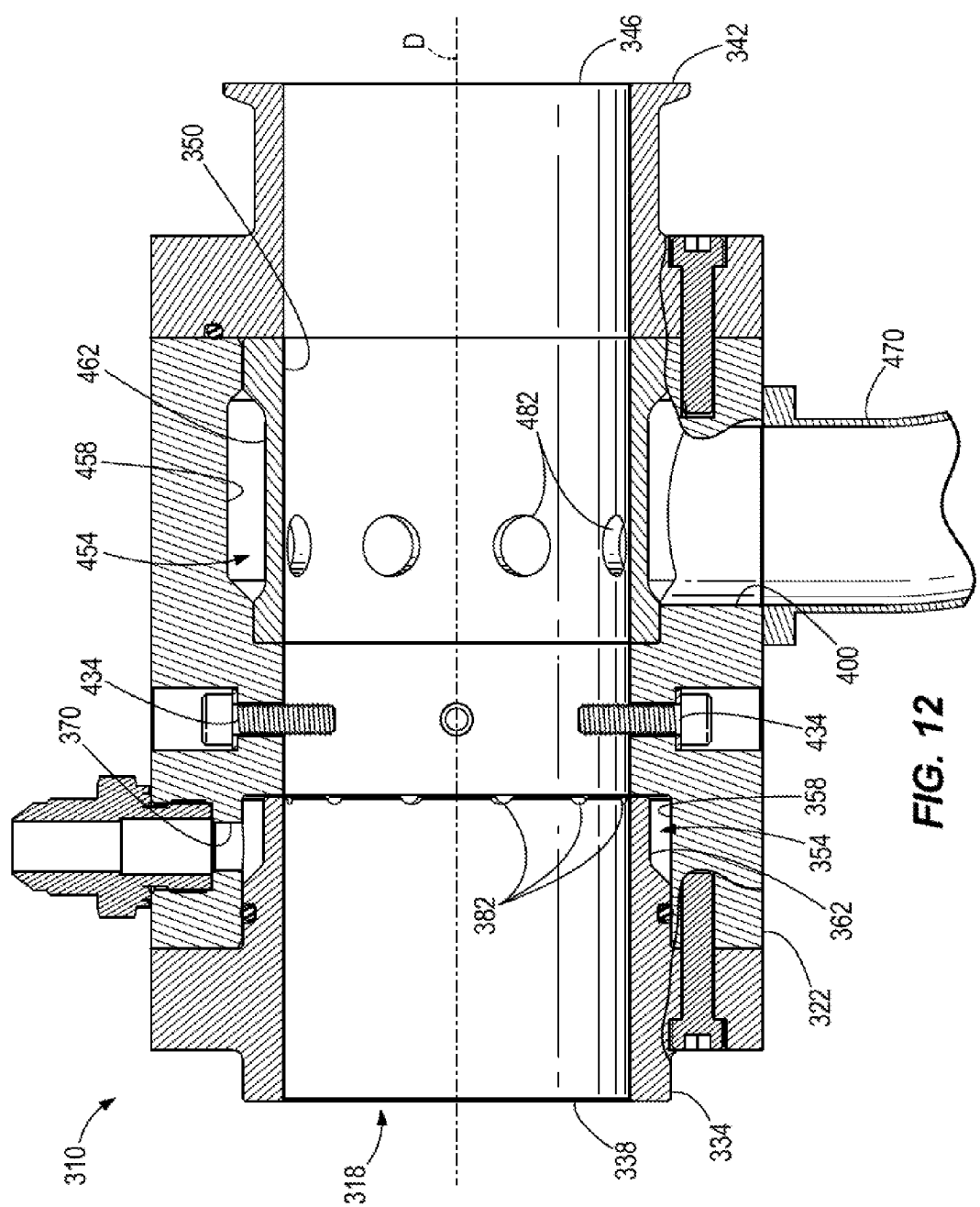
FIG. 12 is a cross section view of the diffuser assembly shown in FIG. 10, taken along the line 12-12 of FIG. 10 with a blunt trailing edge insert of the diffuser assembly removed.

FIGS. 10-12 illustrate an alternate diffuser assembly 310 that can be used with the mixing device 114 of FIGS. 5-7 and 9. More specifically, the diffuser assembly 310 can be used to replace the throttle body inlet adapter 134, the body 122, and the diffuser 150 which define the intake passage 118 of the mixing device 114 of FIGS. 5-7 and 9. Note that parts similar to those in FIGS. 5-7 and 9 have the same numbers but increased by 100 or in some instances, 200. Similarly numbered parts also have similar functions. Details of the similarly numbered parts can be found above in the descriptions of FIGS. 1-9. In addition to the mixing of gaseous fuel with the intake airflow, the diffuser assembly 310 is configured to allow for exhaust gas to be recirculated into the engine intake. Exhaust Gas Recirculation (EGR) provides various engine performance benefits, including improved efficiency, increased torque, and reduced emissions vs. engines without EGR. Although the diffuser assembly 310 of the illustrated construction is embodied as a replacement for components of the mixing device 114 of FIGS. 5-7 and 9, the mixing device 14 of FIGS. 1-4 may be modified in accordance with features of the diffuser assembly 310 to incorporate EGR capability.

As best seen in FIG. 12, the diffuser assembly 310 includes a throttle body inlet adapter 334 coupled to a body 322 at an upstream end of the body 322. The throttle body inlet adapter 334 defines an inlet 338 of the intake passage 318. Further, a portion of the throttle body inlet adapter 334 forms a diffuser and is removably coupled to the body 322 on a side of the throttle body inlet adapter 334 opposite the inlet 338. When removably coupled to the body 322, a radially inner surface of the throttle body inlet adapter 334 is flush with a radially inner surface of the generally cylindrical opening of the body 322 to define a smooth transition in the axial direction. Further, the side of the throttle body inlet adapter 334 opposite the inlet 338 is radially encircled by the body 322. The throttle body inlet adapter 334 also defines a radially inner wall 362 of a first annular channel 354 that encircles the intake passage 318. The throttle body inlet adapter 334 further defines generally half-circle shaped diffuser apertures 382 arranged generally perpendicular to a center axis D of the intake passage 318. The diffuser apertures 382 are defined in the periphery of a downstream end face of the throttle body inlet adapter 334 and are evenly spaced about a circumference of the downstream end face. The diffuser apertures 382 are bounded on the axially downstream end by abutting an inner shoulder surface of the body 322 that is arranged transverse to the center axis D.

The body 322 defines a radially outer wall 358 of the first annular channel 354, and further includes a generally cylindrical opening extending the length of the body 322. The body 322 further defines an inlet 370 to the first annular channel 354 arranged perpendicular to the center axis D at an upstream or first location along the intake passage 318. The first location is generally where the intake airflow is configured to be mixed with the gaseous fuel directed through the diffuser apertures 382. Additionally, the body 322 defines an EGR inlet opening 400 arranged perpendicular to the center axis D at a second location downstream the first location along the intake passage 318. The second location is generally where recirculated exhaust gas is configured to be mixed with the intake airflow and the gaseous fuel as discussed below. Further, the EGR inlet opening 400 and the inlet 370 for gaseous fuel are arranged parallel to each other, entering the body 322 from opposite sides, although other arrangements are optional.

An outlet adapter 342 is removably secured to the body 322 downstream of the body 322 and is arranged opposite the throttle body inlet adapter 334. An O-ring is placed between the outlet adapter 342 and the body 322 to ensure a tight seal between the outlet adapter 342 and the body 322. The outlet adapter 342 defines an outlet 346 of the intake passage 318. When secured to the body 322, a radially inner surface of the outlet adapter 342 is flush with the radially inner surface of an EGR diffuser 350 which is secured to the body 322 by attachment of the outlet adapter 342. The EGR diffuser 350, as shown in FIGS. 11 and 12, is a diffuser insert removably secured to the body 322 and separable therefrom. Once removably secured to the body 322, a radially inner surface of the EGR diffuser 350 is flush with the radially inner surfaces of the generally cylindrical opening of the body 322 and that of the outlet adapter 342 to maintain a consistent, smooth diameter of the intake passage 318. The EGR diffuser 350 defines radial diffuser apertures 482 arranged generally perpendicular to the center axis D (see FIG. 12). The EGR diffuser 350 also defines a radially inner portion 462 of a second annular channel 454 which encircles the intake passage 318. The body 322 defines a radially outer portion 458 of the second annular channel 454 and radially surrounds or encircles the second annular channel 454. Further, the EGR diffuser 350 is located at the same axial location as the EGR inlet opening 400 to receive EGR flow directly therefrom in the radial direction. In other embodiments, not illustrated, the outlet adapter 342 and the EGR diffuser 350 are provided as a single, integrated component.

Although removed for clarity in FIG. 12, an aerodynamic blunt trailing edge insert 424 is removably secured to the body 322 and contained within the body 322. The blunt trailing edge insert 424 includes a torpedo shaped body 428 which is coaxial with the center axis D. The blunt trailing edge insert 424 also includes four fins 432 arranged at 90 degree angles to one another about the center axis D. Each fin 432 has a flat end which includes a threaded bore for receiving a mounting screw 434 that is inserted into the body 322 through holes in an exterior of the body 374. The blunt trailing edge insert 424 is positioned along the intake passage 318 and overlaps both of the first and second annular channels 354, 454, for example extending upstream of the first annular channel 354 and downstream of the second annular channel 454. The blunt trailing edge insert 424, when secured to the body 322 is centered with the central axis D. The blunt trailing edge insert 424 is configured to increase the velocity of the intake airflow in the intake passage 318 by narrowing the cross sectional area of the intake passage 318 transverse to the central axis D along the length of the blunt trailing edge insert 424. The increased velocity of the intake airflow creates a local pressure drop to assist the introduction of gaseous fuel and recirculated exhaust gas, thus minimizing the back pressure on the injectors and the exhaust system. The expansion of the intake gases within the intake passage 318 after the blunt trailing edge insert 424 assists with the mixing of intake gases.

The radially inner surfaces of the throttle body inlet adapter 334, the body 322, the outlet adapter 342, the diffuser 350, and an outer surface of the blunt trailing edge insert 424 all combine to define the cross-sectional shape of the intake passage 318, which extends from the inlet 338 to the outlet 346.

Gaseous fuel is introduced to the diffuser assembly 310 through the inlet 370 to the first annular channel 354 of the body 332. In particular, the fuel connection passage 240 of FIGS. 5-7 and 9 is coupled to the inlet 370 to the first annular channel 354 and fluidly connects the inlet 370 to the first annular channel 354 to receive fuel from the fuel inlet manifold 190. As discussed above, the common injector receiving chamber 224 of the inlet manifold 190 is configured to direct fuel to the fuel connection passage 240, which further directs the gaseous fuel to the first annular channel 354 and through the diffuser apertures 382 of the throttle body inlet adapter 334.

EGR is configured to be introduced to the diffuser assembly 310 through an EGR supply pipe 470 coupled to the EGR inlet opening 400. Further the EGR supply pipe 470 directs exhaust gas to the second annular channel 454 and through the EGR diffuser 350. The EGR supply pipe 470 is coupled to an exhaust system of the engine.

As discussed above in reference to FIGS. 1-9, the diffuser assembly 310 of FIGS. 10-12 is customizable. The throttle body inlet adapter 334, the outlet adapter 342, the blunt trailing edge insert 424, and the diffuser 350 are all removably secured or removably coupled to the body 322 and can be removed or replaced as needed for different applications or different engines. Additionally, although the diffuser assembly 310 is described above as replacing parts of the mixing device 114 in FIGS. 5-7 and 9, parts of other mixing devices can also be coupled to the diffuser assembly 310 such that the mixing device benefits from the recirculated exhaust gas. Further, in other embodiments of the diffuser assembly 310 not illustrated, the diffuser assembly 310 can be configured so that the EGR inlet opening 400 is upstream of the inlet 370 to the first annular channel 354.

FIG. 13 illustrates a schematic of the engine in operation with the mixing device 114 modified with the alternate diffuser assembly 310 having EGR capability. In operation, the intake air is provided through the inlet 338 of the throttle body inlet adapter 334 to the diffuser assembly 310. Further the fuel supply provides gaseous fuel, as described above in reference to FIGS. 5-7 and 9, to the inlet 370 to the first annular channel 354. The gaseous fuel is directed into the first annular channel 354 and through diffuser apertures 382 of the throttle body inlet adapter 334 to mix the gaseous fuel with the intake airflow. Exhaust gas from the engine is delivered to the EGR inlet opening 400 through the EGR supply pipe 470 for recirculation through the engine. The EGR is directed through the second annular channel 454 and through the EGR diffuser 350, where it is mixed with the intake airflow and the gaseous fuel. The EGR may be high pressure EGR, as discussed above.

Referring again to FIGS. 5-7 and 9, as discussed above, the valve 248 is positioned along the fuel connection passage 240. The valve 248 is configured to selectively block fluid communication between the fuel inlet manifold 190 and the inlet 170 to the annular channel 154 of the body 122. The valve 248 is positioned along the fuel connection passage 240 in order to prevent undesired draining of the gaseous fuel from the injector receiving chamber 224. For example, following a reduction in engine load, reduced pressure may be seen in the intake airflow through the intake passage 118. This reduction in pressure can cause excess gaseous fuel to be drawn from the injector receiving chamber 224 into the intake passage 118.

The controller 252 of the mixing device 114 is configured to actuate the valve 248, and is configured to communicate with the engine and an engine control unit of the engine. The controller 252 is further configured to selectively move the valve 248 to a closed position to block gaseous fuel through the fuel connection passage 240 and to move the valve 248 to an opened position to allow the passage of gaseous fuel through the fuel connection passage 240. The valve 248 can be electronically controlled by the controller 252 via a variable electronic signal, or via the presense/absence of an electronic signal to move the valve 248 away from a biased position. The controller 252 is also configured to output electronic signals to control operation of the gaseous fuel injectors 94 or to be in communication with the engine control unit having said function. Whether incorporated with the controller 252 or separate, the combustion of the engine having the mixing device 114 is controlled by executing a control strategy programmed to the controller, including a variety of functions that can include throttle opening, fuel amount and timing, valve lift profile and timing, turbocharger wastegate opening, among others.

In operation, the mixing device 114 and the engine may be operated in order to control the discharge of gaseous fuel into the engine in order to cause the flow of gaseous fuel from the mixing device 114 into the engine to come to a quick halt. The method involves operating the mixing device 114 to discharge gaseous fuel into the common injector receiving chamber 224 of the fuel inlet manifold 190. The gaseous fuel is conveyed from the common injector receiving chamber 224, through the fuel connection passage 240, into the annular channel 154, and through the diffuser 150 where the gaseous fuel is mixed with the intake air in the intake passage 118. While injecting the gaseous fuel, the engine is operating to combust the injected gaseous fuel. When an operator of the engine turns off the engine, an ignition off signal is sent to the controller 252 through the engine control unit of the engine. In response, the controller 252 signals the valve 248 to close. The gaseous fuel injectors 94 are also signaled to cease injecting gaseous fuel. Further, sending the injection off signal through the engine control unit also directs the engine to cease combustion of injected gaseous fuel (e.g., cease spark ignition). Taking advantage of the further downstream location of the valve 248 compared to the gaseous fuel injectors 94, fuel conveyance into the engine can be stopped more rapidly for precision control. For example, the valve 248 may close prior to the full ceasing of fuel discharge from the gaseous fuel injectors 94, such that the valve 248 blocks gaseous fuel discharged from the gaseous fuel injectors 94 from reaching the engine. This provides a simple, repeatable manner of ceasing combustion without unpredictable follow-on combustion events having poor combustion quality. In an alternate embodiment, the valve 248 is positioned along the fuel connection passage 240 at an end 244 of the fuel connection passage 240 proximate the inlet 170 to the annular channel 154 of the body 122. As such, closing the valve 248 minimizes the residual amount of gaseous fuel that has been injected, but that has not reached the annular channel 154.

Furthermore, it should be noted that a similar function may be carried out in response to detecting the need for engine load reduction (e.g., the driver lifts off the accelerator pedal). When engine torque must be reduced, the amount of fuel is also reduced. Although an electronic signal is sent to the gaseous fuel injectors 94 in accordance with this torque reduction (i.e., instructing the injectors 94 to reduce injection amount or cease injecting), a signal to close or partially close the valve 248 can be carried out prior to or in combination with such an injector control. Again, the downstream positioning of the valve 248 enables a faster response to the demand of such an engine torque reduction.

The valve 248 may also serve to provide adequate sealing of fuel from the environment, even in the case where some or all of the gaseous fuel injectors 94 are not leak-free when closed. For example, the gaseous fuel injectors 94 in some cases may not include any elastomer sealing element at their outlets, instead having metal-to-metal closing elements at their outlets. In some cases, some or all of the gaseous fuel injectors 94 may not be leak-free as defined by testing procedures of Regulation 110 of United Nations Economic Commission for Europe, which is incorporated by reference herein. Rather, a small amount of leakage from the gaseous fuel injectors 94 may be acceptable when the valve 248 can be relied upon to contain the gaseous fuel and prevent its emission to the atmosphere. By using less sophisticated gaseous fuel injectors 94, overall system cost is kept low while providing high reliability. The valve 248 in the fuel connection passage may be leak-free as defined by testing procedures of Regulation 110 of United Nations Economic Commission for Europe.

The embodiments described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention.

The invention claimed is:

1. A mixing device for introducing gaseous fuel into an intake passage of an engine, the mixing device comprising:
   a body through which the intake passage extends for directing the intake airflow into the engine;
   an annular channel defined within the body to at least partially encircle the intake passage, wherein the body defines a fuel inlet opening intersecting with a radially outer portion of the annular channel;
   a plurality of gaseous fuel injectors arranged to discharge gaseous fuel into a fuel inlet manifold;
   a fuel connection passage extending between the fuel inlet manifold and the fuel inlet opening of the body and configured to receive all of the gaseous fuel discharged from all of the plurality of gaseous fuel injectors;
   a diffuser positioned within the body, wherein the diffuser is positioned along the intake passage at a position of the annular channel to diffuse gaseous fuel from the annular channel into the intake airflow in the intake passage; and
   a valve positioned along the fuel connection passage and configured to selectively block fluid communication between the fuel inlet manifold and the fuel inlet opening of the body in response to an electrical signal from at least one electronic controller programmed to execute control strategies controlling operation of the engine, the plurality of gaseous fuel injectors, and the valve.

2. The mixing device of claim 1, wherein the plurality of gaseous fuel injectors includes fuel injectors which are not leak-free, and wherein the valve positioned along the fuel connection passage is leak-free.

3. The mixing device of claim 1, wherein the plurality of gaseous fuel injectors includes fuel injectors which do not include an elastomeric sealing element at the respective outlets.

4. The mixing device of claim 1, wherein the valve is positioned along the fuel connection passage at an end of the fuel connection passage proximate the fuel inlet opening of the body.

* * * * *